(12) United States Patent
He et al.

(10) Patent No.: US 10,638,882 B1
(45) Date of Patent: May 5, 2020

(54) GAS AIR FRYER

(71) Applicant: Team International Group of America Inc., Miami Gardens, FL (US)

(72) Inventors: Arno He, Guangdong (CN); Uri Murad, Hollywood, FL (US)

( * ) Notice: Subject to any disclaimer, the term of this patent is extended or adjusted under 35 U.S.C. 154(b) by 0 days.

(21) Appl. No.: 16/387,604

(22) Filed: Apr. 18, 2019

Related U.S. Application Data

(60) Provisional application No. 62/789,125, filed on Jan. 7, 2019.

(51) Int. Cl.
*A47J 37/07* (2006.01)

(52) U.S. Cl.
CPC ....... *A47J 37/0754* (2013.01); *A47J 37/0713* (2013.01)

(58) Field of Classification Search
CPC .......................... A47J 37/0754; A47J 37/0713
USPC ....................................................... 126/21 A
See application file for complete search history.

(56) References Cited

U.S. PATENT DOCUMENTS

| | | | | |
|---|---|---|---|---|
| 5,994,672 A | * | 11/1999 | Mestnik ................. | A47J 36/38 219/400 |
| 2008/0098902 A1 | * | 5/2008 | Mansfield ........... | A47J 37/0786 99/339 |
| 2008/0206420 A1 | * | 8/2008 | McFadden ............. | A21B 1/245 426/523 |
| 2018/0255971 A1 | * | 9/2018 | Moon ................. | A47J 37/0641 |

* cited by examiner

*Primary Examiner* — Grant Moubry
*Assistant Examiner* — Benjamin W Johnson
(74) *Attorney, Agent, or Firm* — Frank Marino

(57) ABSTRACT

An air frying apparatus for use with a gas barbeque or alone has a blower-burner portion and a chamber portion. The blower-burner portion has an intake for receiving ambient air, a burner for heating the received air, a window in communication with the chamber portion, and a blower for dispersing the heated air into the chamber portion. The chamber portion has a perforated basket for receiving foodstuff and is adapted to allow access to the foodstuff by the dispersed heated air. The air heated by the burner is dispersed through the window to the chamber portion by the blower where it air-fries the foodstuff in the basket.

14 Claims, 8 Drawing Sheets

GAS AIR FRYER

FIELD OF THE INVENTION

The invention relates to apparatuses for frying foodstuffs in hot air and without submersion in cooking oil.

BACKGROUND

Common electrical air frying appliances include an electric heating element for heating air within the appliance and a blower for forcing the air over and around the foodstuffs to be air-fried. Such appliances function adequately but are made only for indoor use and may cause smoke and undesired cooking fumes. Summertime is a very popular time for outdoor cooking. Many fried foods, such as fried chicken, onion rings, and fried claims are popular summertime food, but have so far required indoor cooking. Few food items are as historically paired as hamburgers and French fries, yet summertime burgers are typically cooked outdoors while French fries have so far required indoor cooking.

In order to simulate the qualities of properly deep-fried foods, air fried foods must be exposed to turbulent air having a temperature of approximately 220 degrees C. This ensures the even browning and crispiness like that which is obtained when cooking in hot oil. But such is difficult to obtain from a propane flame. While propane burns at a very high temperature, transferring that heat from the flame in a highly turbulent environment to obtain the needed air-frying temperature and turbulence at the food has so far been unobtainable.

There exists the need for an apparatus which allows for the outdoor cooking of fried foods, and such may be an object of the invention. There exists the need for an apparatus which allows for such outdoor cooking of fried foods in combination with outdoor grilling, and such may be an object of the invention. There exists the need for the ability to share fuel use, cooking utensils, clean-up, and other things between outdoor grilling and outdoor frying, and such may be an object of the invention. There exists the need for a system which causes a high enough temperature at its heat source to result in adequate air-frying conditions at the food, and such may be an object of the invention. There exists the need for a system which causes that high enough temperature by injecting air into the heat source using a blower that also causes the needed turbulence for those adequate air-frying conditions at the food, and such may be an object of the invention. Further needs and objects of the invention will become apparent upon a review of the following disclosure of an exemplary embodiment.

SUMMARY OF THE INVENTION

The invention may be embodied in or practiced using a gas burning air-frying appliance of a gas burning air-frying accessory to an outdoor gas grill.

The invention may be embodied in or practiced using an air frying apparatus with a blower-burner portion and a chamber portion. The blower-burner portion may have an intake for receiving ambient air, a burner for heating the received air, a window in communication with the chamber portion, and a blower for dispersing the heated air into the chamber portion. The chamber portion may include a perforated basket for receiving foodstuff and may be adapted to allow access to the foodstuff by the dispersed heated air. The air heated by the burner may be dispersed through the window to the chamber portion by the blower where it air-fries the foodstuff in the basket. The blower-burner portion and the chamber portion may be within a housing and the chamber portion may have a drawer adapted to be pulled from the housing to access the basket. The drawer may be covered by the housing during the air-frying and may be uncovered when pulled from the housing to allow the access to the basket. The chamber portion may have an outlet for exhausting the heated air from the chamber portion. The drawer may have a handle disposed in a front thereof, and the outlet may be directed rearwardly and away from the handle. The burner may be a gas burner. The blower may be an electric blower. The blower may cause the received air to feed a flame of the gas burner and thereby increase its temperature to increase the heated air's temperature. The heated air's increased temperature may be approximately 220 degrees C. when reaching the chamber portion.

The invention may also be embodied in or practiced using, in combination, a gas barbeque grill and the above air frying apparatus. The gas barbeque grill may provide the above housing. The drawer may be covered by the gas barbeque grill during the air-frying and may be uncovered when pulled from the gas barbeque grill to allow the access to the basket.

Further features and aspects of the invention are disclosed with more specificity in the Detailed Description and Drawings provided herein and showing exemplary embodiments of the invention.

BRIEF DESCRIPTION OF THE DRAWINGS

An exemplary embodiment of a gas burning air frying accessory for a gas barbeque grill in accordance with or useful in practicing the invention is shown in the accompanying Drawings, of which.

DESCRIPTION OF AN EXEMPLARY EMBODIMENT

Figure 1:
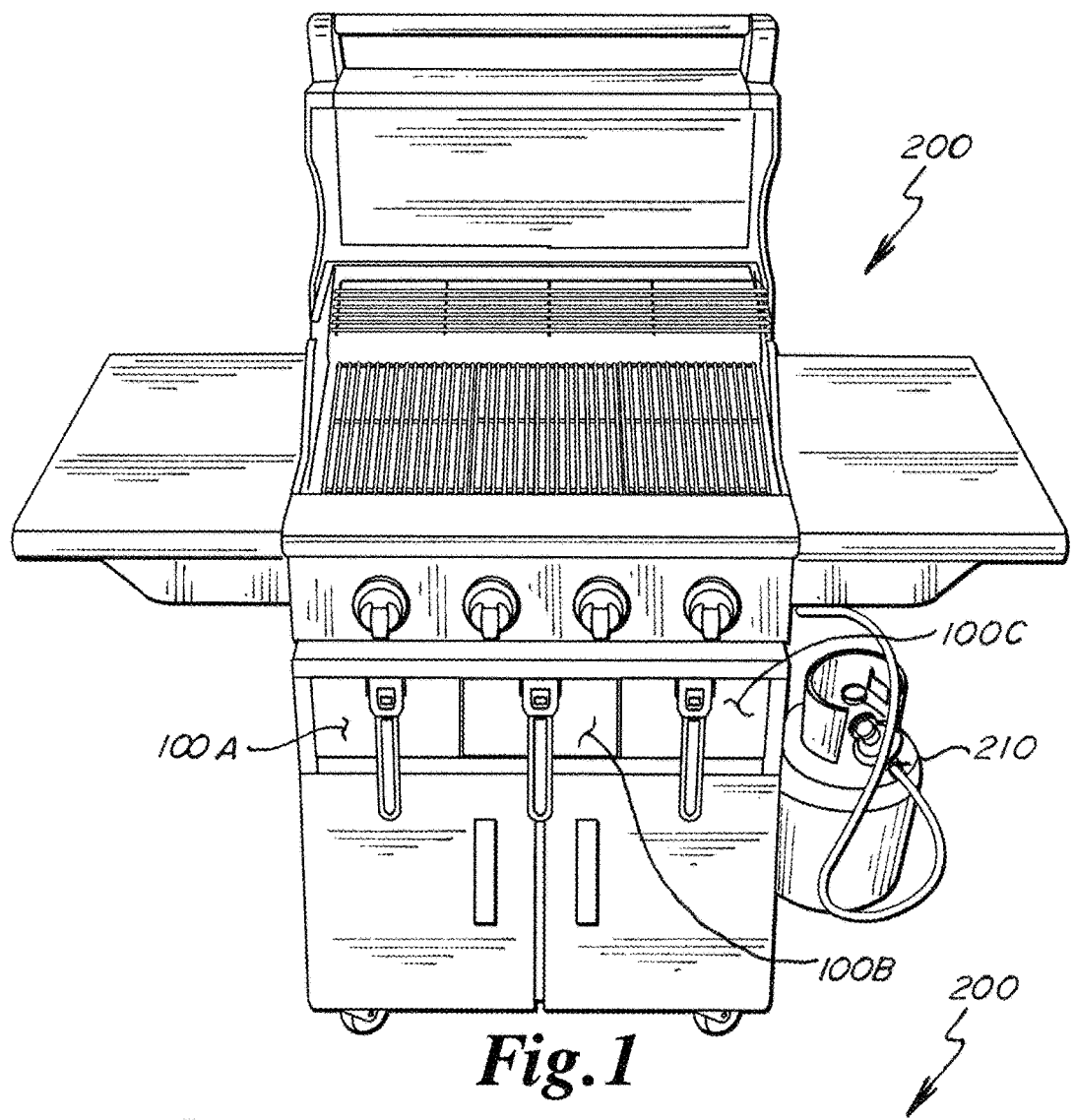
FIG. 1 is a front view of a gas barbeque grill employing an accessory in accordance with in accordance with or useful in practicing the invention.
Figure 2:
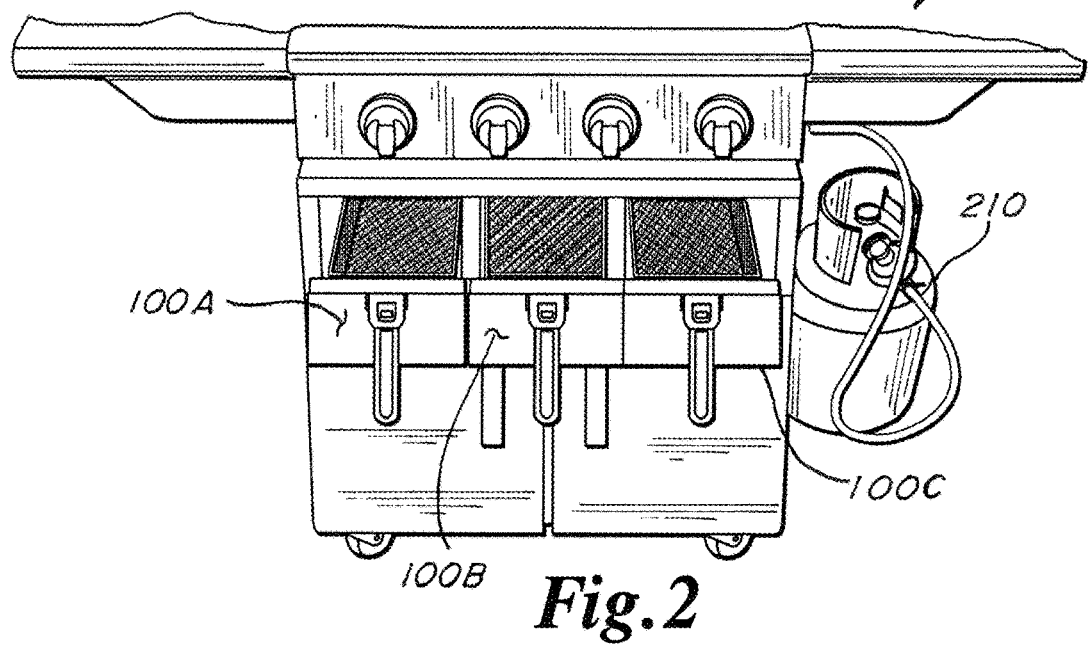
FIG. 2 is a partial front view of the barbeque grill of FIG. 1 with the drawers of the accessory opened.
Figure 3:
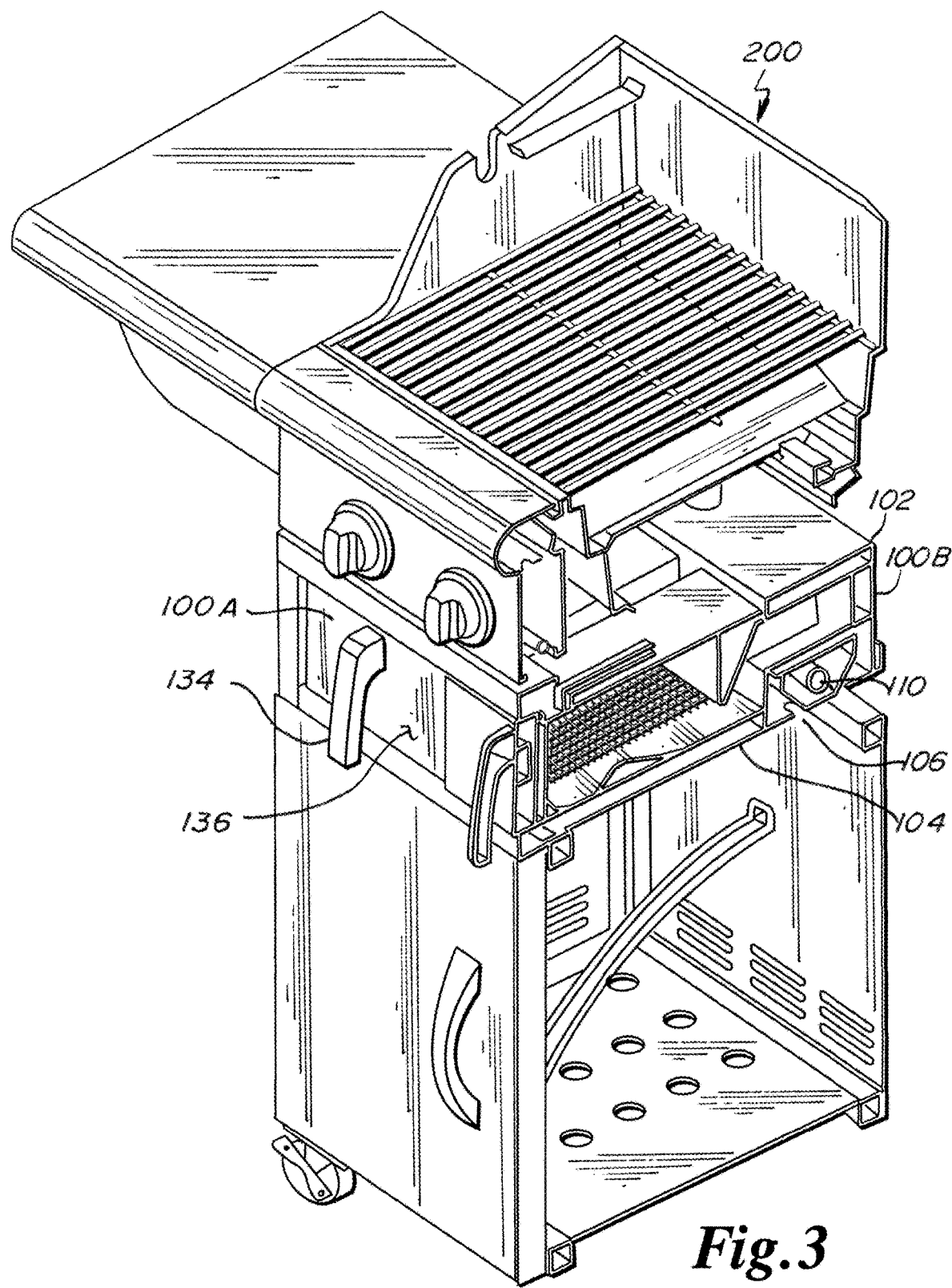
FIG. 3 is a partial cut-away front perspective view of the barbeque grill and accessory of FIG. 1.
Figure 4:
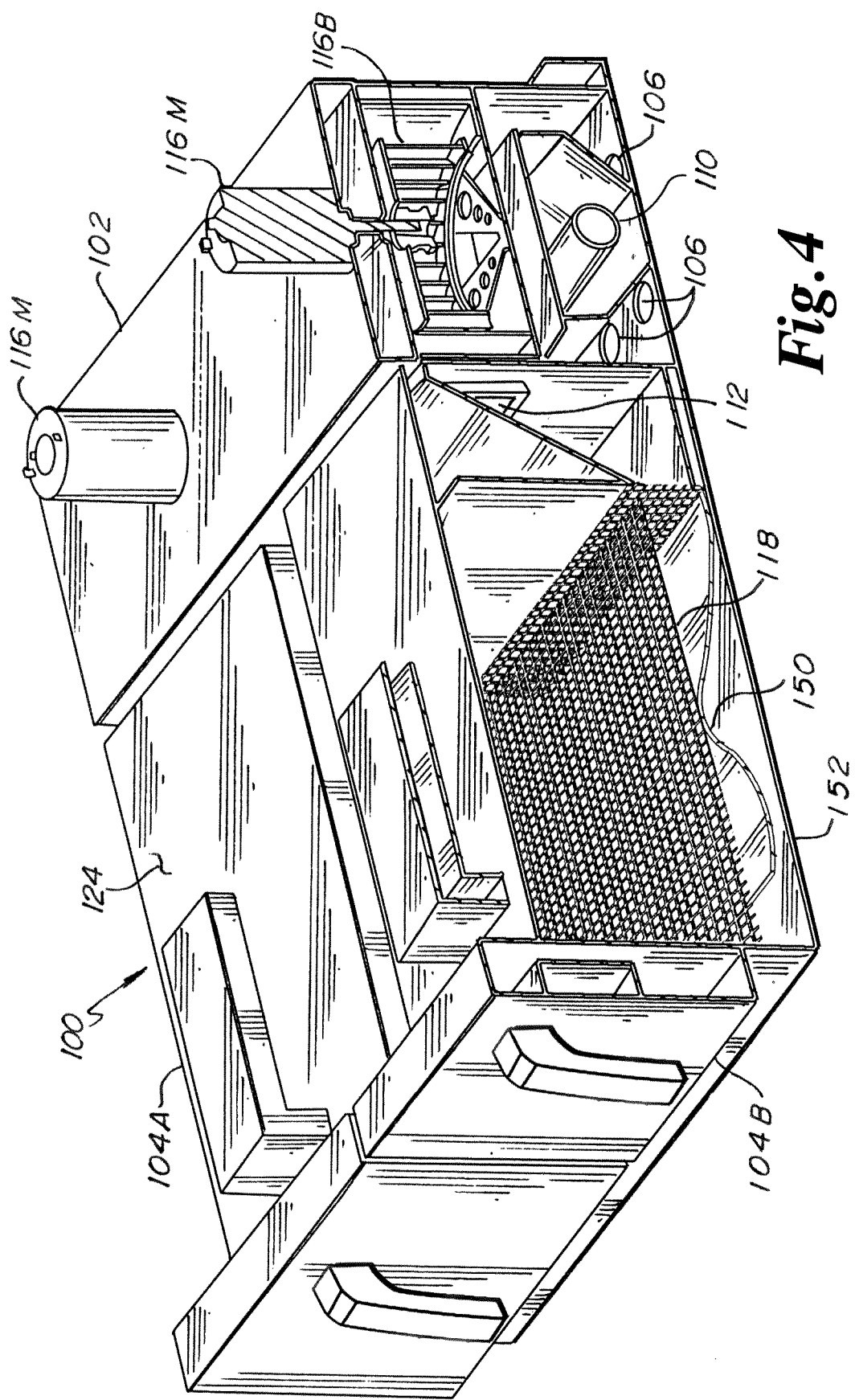
FIG. 4 is a partial cut-away perspective view of the accessory of FIG. 1.
Figure 5:
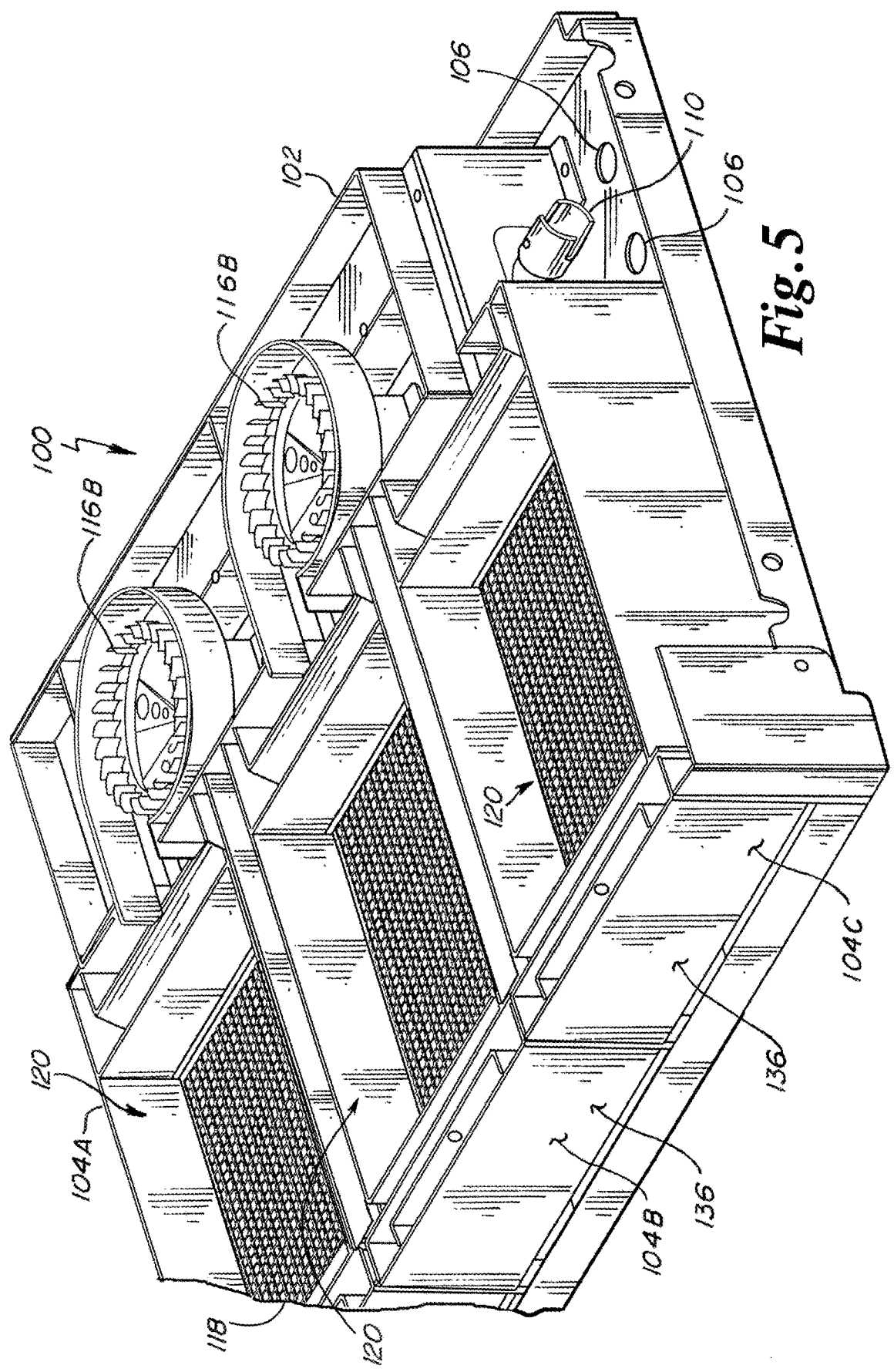
FIG. 5 is a partial perspective view of the accessory of FIG. 1.
Figure 6:
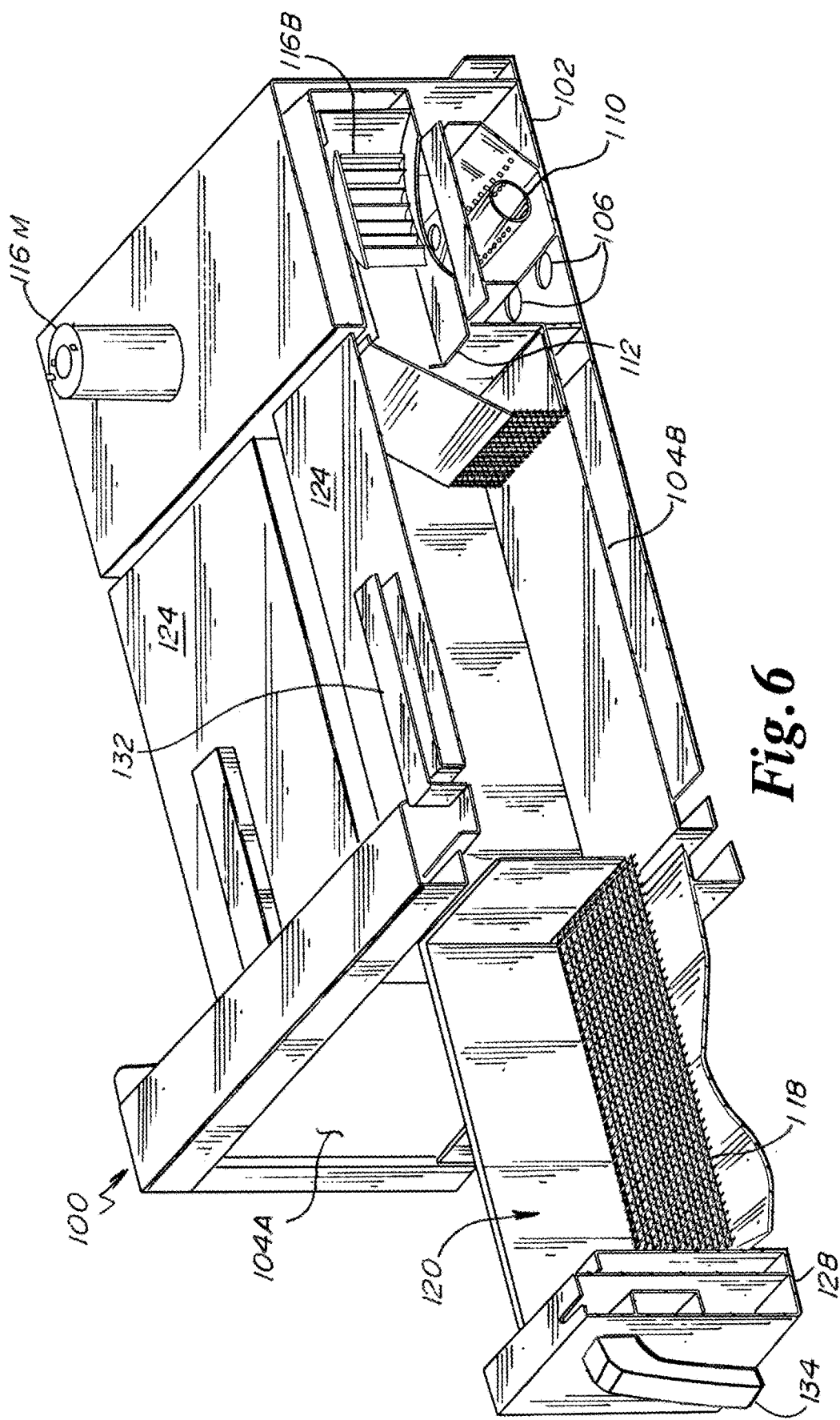
FIG. 6 is a partial cut-away perspective view of the accessory of FIG. 1 with one of its drawers opened.
Figure 7:
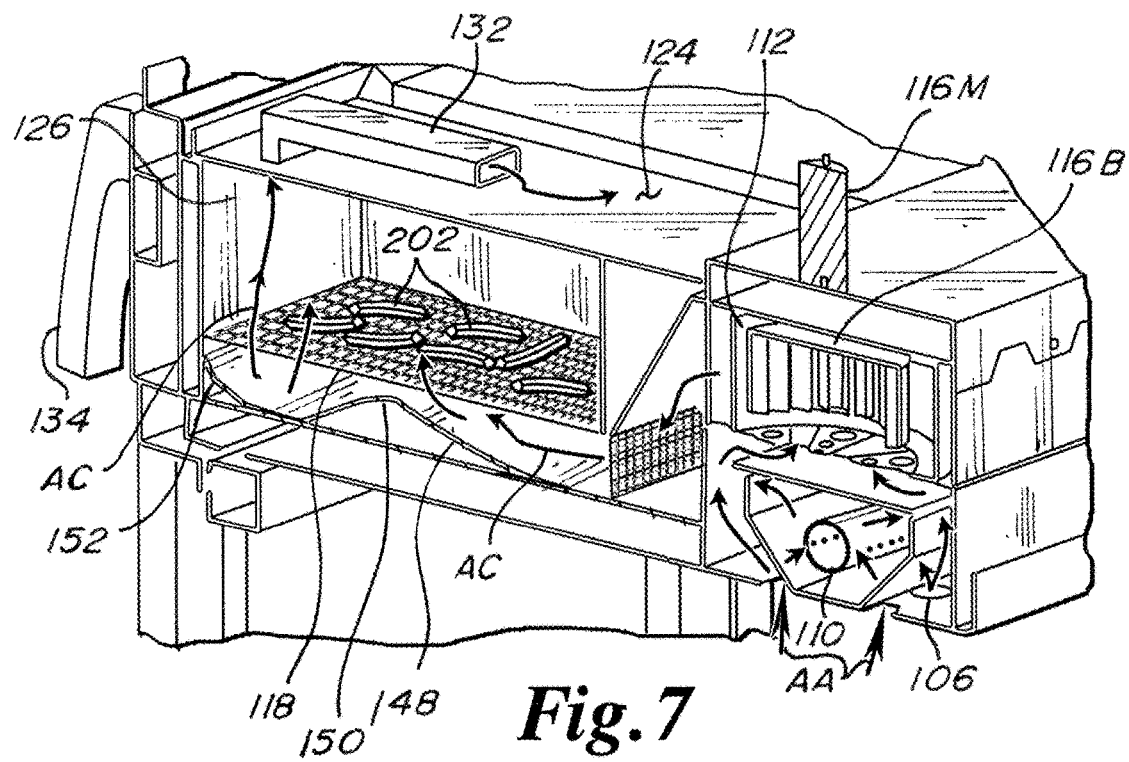
FIGS. 7 and 8 are cut-away views showing the airflow through the accessory of FIG. 1.
Figure 8:
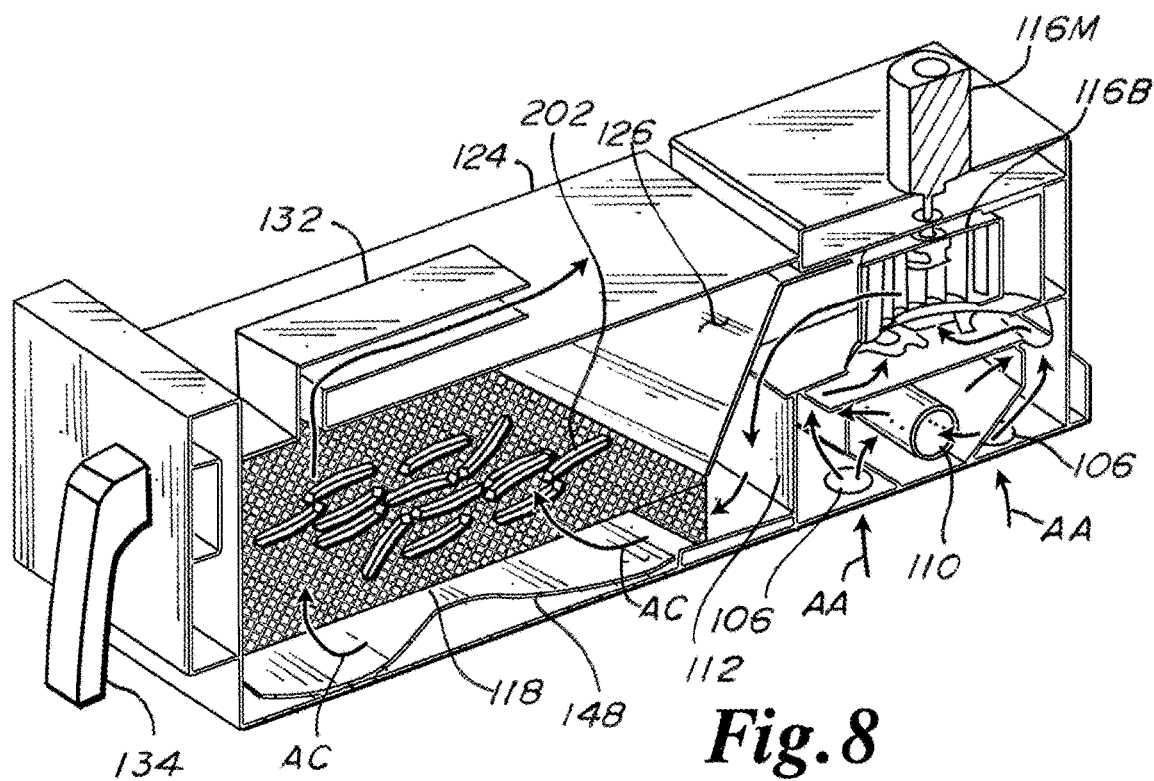
Figure 9:
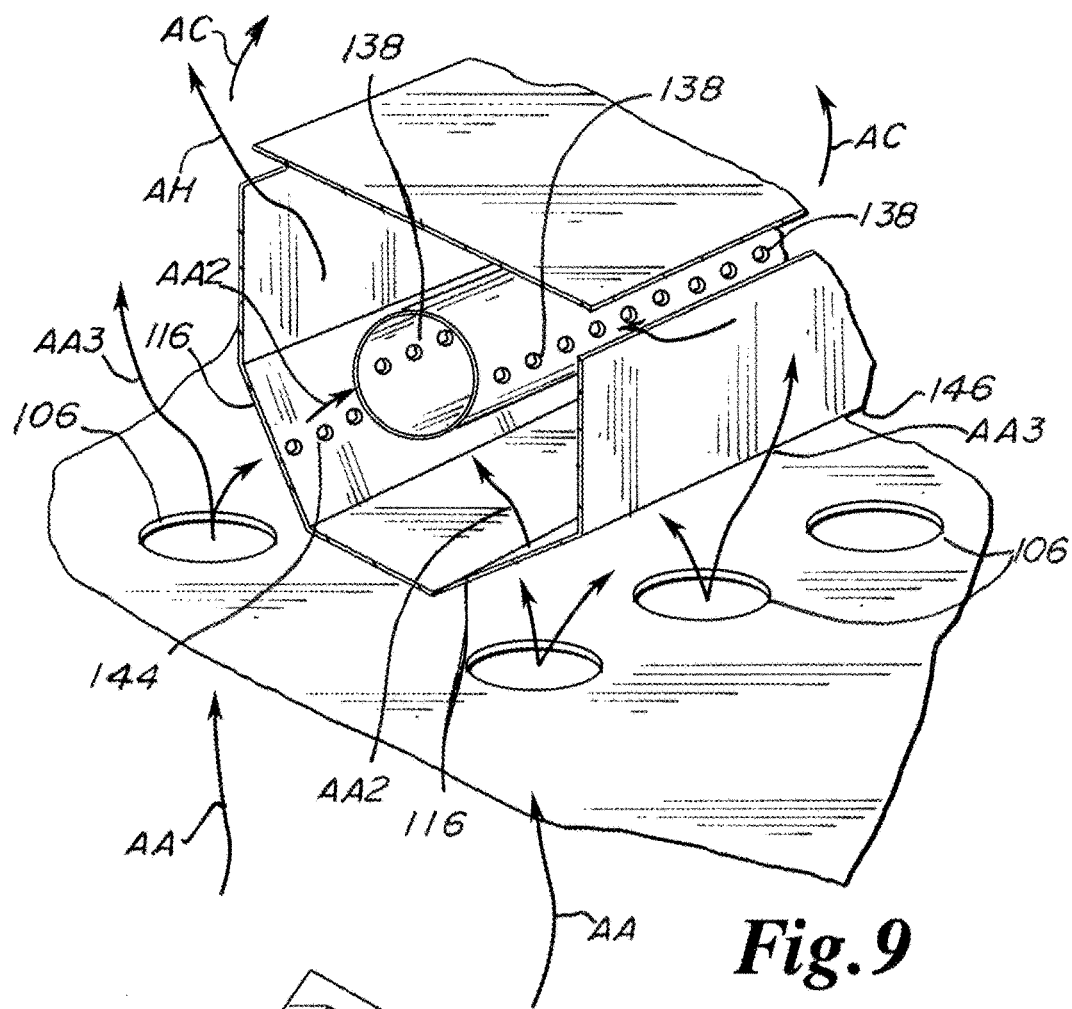
FIG. 9 is a partial perspective view of the combustion enclosure of the accessory of FIG. 1.

Referring to FIGS. 1 through 10, there is shown an exemplary air frying accessory 100 having plurality of modules 100A, 100B, and 100C, and a gas barbeque grill 200 within which it is used. The air frying accessory and the barbeque grill both receive propane gas for burning from the same tank 210. But of course the type of gas used for fuel could alternatively be any other available flammable gas, including such gases as natural gas, methane, butane, and mixed gases. The air frying modules are all the same, and by having a plurality it enables the user to air-fry different foods at the same time or to stagger the timing of air-fried servings.

The air frying accessory has a blower-burner portion 102 and each module has a chamber portion 104A, 104B, and 104A (individually as 104). The blower-burner portion has intakes 106 for receiving ambient air AA, a burner 110 for heating the received air, a window 112 in communication with the chamber portion, and a blower for each module for dispersing the heated air 116 into the associated module's chamber portion. The blowers each include an electric motor 116M and a cylindrical blower wheel 116B. The chamber portion includes a perforated bottom panel 118 to thereby function as a perforated basket 120 for receiving foodstuff 202 and to allow access to the foodstuff by the dispersed heated air AC. The chamber portion is covered by chamber cover 124 so that the basket is enclosed within cooking chamber 126 during frying. The air heated by the burner is dispersed through the window to the chamber portion and into and around the foodstuff in the cooking chamber by the blower where it air-fries the foodstuff.

The blower-burner portion and the chamber portion are housed by the gas barbeque grill 200. The bottom of the chamber portion is a drawer 128 adapted to be pulled from the gas barbeque grill to access the basket. When the drawers are so pulled from the barbeque, covers 124 remain stationary within the barbeque. The open top of the drawer is thereby covered by the gas barbeque grill 200 during the air-frying and is uncovered when pulled from the gas barbeque grill to allow the access to the basket.

Each chamber portion includes an outlet 132 for exhausting the heated air from the chamber during cooking, so that freshly heated air may enter through the perforated bottom panel to maintain the desired temperature within the chamber.

Each drawer has a handle 134 disposed on its front face 136, and the outlet is directed rearwardly within the barbeque and away from the handle. In this way, the front of the barbeque, accessory, and handle do not become too hot to touch, and the exhausted hot air can be repurposed to add heat for the barbequing above.

Figure 10:
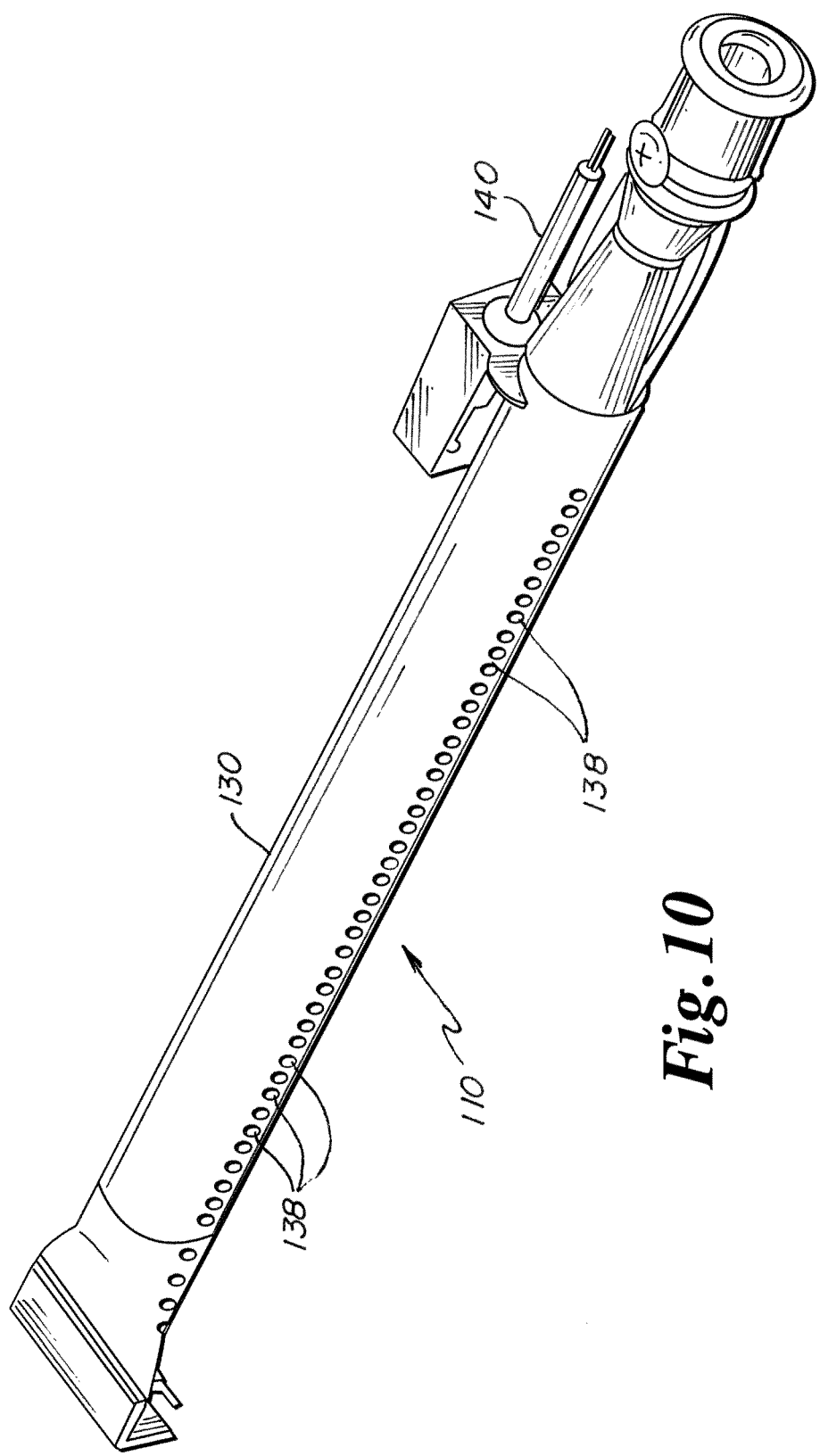
FIG. 10 is a view of the burner of the accessory of FIG. 1.

The burner 110 is shown independently in FIG. 10 and is a typical tubular gas burner similar to those commonly used in gas barbeques, having an elongated stainless steel tube 130 with a line of orifices 138 along each side. Gas flows from the orifices and is ignited by ignitor 140, which is a typical magneto spark-ducing device common built into gas barbeques and actuated by a trigger button (not shown). The gas burns during frying to provide heat for frying.

Figure 11:
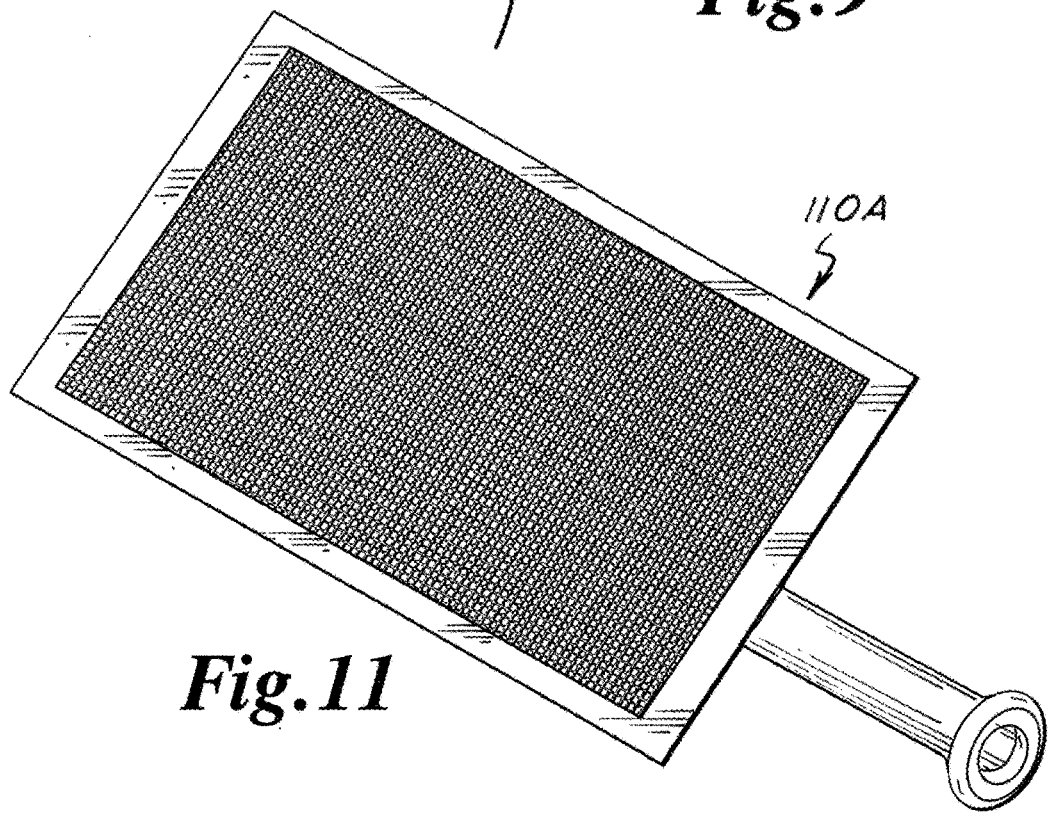
FIG. 11 is a view of an alternate gas infrared burner for the accessory of FIG. 1.

An alternative infrared gas burner 110A is shown in FIG. 11, which is similar to those commonly used in searing barbeques.

It is a unique feature of the burner and blower portion that the temperature of the flame is increased by the blower, by pulling ambient air AA in through ambient air intakes 106 at the bottom of the burner and blower portion and drawing some AA2 of that air through a line of ports 144 along the diagonal walls 116 along the bottom of the burner's stainless steel combustion enclosure 146. This is all best seen in FIGS. 7 through 9.

The ports are arranged parallel to and are directed at the line of orifices 138 of the burner and sized to force the incoming air into a series of linear air jets which impinge as upon the base of the flames exiting the orifices. This injects oxygen directly into the base of each flame and increases its temperature to over 1000 C and increases the flame's intensity significantly. The air directed at the flame is strong enough to increase gas combustion but not strong enough to blow out the flame. The "super-heated" air AH that is thereby created is mixed with that portion AA3 of the ambient air that bypassed the combustion enclosure 146 to create cooking air AC of approximately 230 C, which is then pulled by the blower and forced through window 112, through the perforated bottom panel 118 and into the basket, by which time the long and serpentine air path has cooled it to approximately 220 C which is prefect for cooking the food therein.

The injection of ambient air into the flame also causes the propane to burn more evenly and efficiently, and reduces the production of undesirable CO and NOx gases.

Stainless steel wave panel 148 of the drawer serves the purpose of turbulizing and directing the cooking air as it enters the basket, which is important for evenly cooking and browning the food. The wave panel has two ramps 150 and 152 which are perpendicular to the airflow. Ramp 150 is impacted first by the heated air and causes some of the heated air to pass immediately through the perforated bottom panel and into the basket while allowing the remainder of the heated air to pass there-over and under the perforated bottom panel towards ramp 152, which then deflects that remining air towards and through the perforated bottom panel. This results in a very even distribution of the heated air through the perforated bottom panel while allowing it to remain in a very turbulent state, so that the food is exposed to the cooking air evenly on all sides and from all directions.

The cooking air is then exhausted through outlet 132, which directs it back away from the user-accessible front 154 of the accessory and into the interior of the barbeque grill . . . where it may be used to compliment the barbequing heat.

While the air fryer modules are shown as built-in accessories to a barbeque grill, One or more modules could alternatively be enclosed within a dedicated housing to provide a stand-alone gas-powered air frying appliance.

While the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. An air frying apparatus comprising:
   a blower-burner portion; and
   a chamber portion disposed below a grilling portion;
   the blower-burner portion comprising an intake that receives ambient air, a burner that heats received air, a window in communication with the chamber portion, a blower that disperses heated air into the chamber portion, and one or more ports directed at the burner and sized to cause the received air to impinge upon one or more flames exiting the burner;
   the chamber portion comprising a perforated basket for receiving foodstuff that is adapted to allow the heated air dispersed by the blower to access the foodstuff, wherein
   the received air heated by the burner is dispersed through the window to the chamber portion by the blower where it air-fries the foodstuff in the basket and is then exhausted toward the grilling portion; and wherein
   the burner is a gas burner;
   the blower is an electric blower; and the blower causes the received air to impinge upon the one or more flames sufficiently to feed but insufficiently to extinguish the one or more flames, and to thereby increase the heated air's temperature.

2. The apparatus of claim 1 wherein the blower-burner portion and the chamber portion are disposed within a housing and the chamber portion comprises a drawer adapted to be pulled from the housing to access the basket.

3. The apparatus of claim 2 wherein the drawer is covered by the housing during air-frying and is uncovered when pulled from the housing to allow the access to the basket.

4. The apparatus of claim 3 wherein the chamber portion comprises an outlet for exhausting the heated air from the chamber portion.

5. The apparatus of claim 4 wherein the drawer comprises a handle disposed in a front thereof, and the outlet is directed rearwardly and away from the handle.

6. The apparatus of claim 1 wherein the heated air's increased temperature is approximately 220 degrees C. when reaching the chamber portion.

7. In combination, a gas barbeque grill and an air frying apparatus, the air frying apparatus comprising:
a blower-burner portion; and
a chamber portion disposed below a grilling portion;
the blower-burner portion comprising an intake that receives ambient air, a burner that heats received air, a window in communication with the chamber portion, a blower that disperses heated air into the chamber portion, and one or more ports directed at the burner and sized to cause the received air to impinge upon one or more flames exiting the burner;
the chamber portion comprising a perforated basket for receiving foodstuff that is adapted to allow the heated air dispersed by the blower to access the foodstuff, wherein
the received air heated by the burner is dispersed through the window to the chamber portion by the blower where it air-fries the foodstuff in the basket and is then exhausted toward the grilling portion; and
wherein the burner is a gas burner;
the blower is an electric blower; and
the blower causes the received air to impinge upon the one or more flames sufficiently to feed but insufficiently to extinguish the one or more flames, and to thereby increase the heated air's temperature.

8. The combination of claim 7 wherein the blower-burner portion and the chamber portion are disposed within the gas barbeque grill and the chamber portion comprises a drawer adapted to be pulled from the gas barbeque grill to access the basket.

9. The combination of claim 8 wherein the drawer is covered by the gas barbeque grill during air-frying and is uncovered when pulled from the gas barbeque grill to allow the access to the basket.

10. The combination of claim 9 wherein the chamber portion comprises an outlet for exhausting the heated air from the chamber portion.

11. The combination of claim 10 wherein the drawer comprises a handle disposed in a front thereof, and the outlet is directed rearwardly and away from the handle.

12. The combination of claim 7 wherein the heated air's increased temperature is approximately 220 degrees C. when reaching the chamber portion.

13. An apparatus comprising:
a gas air fryer;
a gas barbecue grill disposed above the gas air fryer; and
a single fuel source that provides gas fuel to both the gas barbeque grill and the gas air fryer;
wherein the gas air fryer has one or more drawers extendible from a location beneath the gas barbecue grill, the one or more drawers each comprising a chamber having a perforated basket for receiving foodstuff therein; and
wherein the gas air fryer is adapted to air fry foodstuff within the basket with heated air generated by combustion of the gas fuel supplied to the gas air fryer and then exhaust the heated air towards the barbeque grill.

14. The apparatus of claim 13 further comprising one or more blowers, each adapted to move air heated by the combustion to the one or more drawers.

* * * * *